United States Patent [19]

Sekmakas

[11] 3,976,615

[45] Aug. 24, 1976

[54] WATER DISPERSIBLE EPOXY ETHER-AMINOACRYLATE POLYMERS

[75] Inventor: Kazys Sekmakas, Chicago, Ill.

[73] Assignee: DeSoto, Inc., Des Plaines, Ill.

[22] Filed: Nov. 13, 1974

[21] Appl. No.: 523,286

[52] U.S. Cl. .................. 260/29.6 HN; 204/181; 260/29.6 TA; 260/47 EP; 260/837 R; 526/213; 526/310; 526/320

[51] Int. Cl.² ........................................ C08F 226/02

[58] Field of Search ...... 260/837 R, 80.3 E, 80.3 N, 260/836, 47 EP, 80.73, 29.6 TA

[56] References Cited
UNITED STATES PATENTS

| | | | |
|---|---|---|---|
| 2,792,381 | 5/1957 | Shokal | 260/47 EP |
| 2,864,804 | 12/1958 | Shokall | 260/47 EP |
| 3,156,674 | 11/1964 | Shokal | 260/80.3 E |
| 3,247,284 | 4/1966 | Heiberger | 260/836 |
| 3,264,370 | 8/1966 | Ott | 260/80.73 |
| 3,642,939 | 2/1972 | Fellers | 260/836 |

*Primary Examiner*—Paul R. Michl
*Attorney, Agent, or Firm*—Dressler, Goldsmith, Clement, Gordon & Shore, Ltd.

[57] ABSTRACT

Epoxy ether-amino acrylate polymers dispersible in water with the aid of an acid are provided by etherifying a polyepoxide with an ethylenically unsaturated alcohol to provide an unsaturated hydroxy-functional polyether containing from about 1.2 to about 2.0 ethylenically unsaturated ether groups per molecule. This polyether is copolymerized in organic solvent solution with monoethylenically unsaturated monomers including amine-functional monomer to provide an amine copolymer which is solubilized in water with an acid at a pH of 5.0–7.0. These water dispersions which are formed can be electrodeposited at the cathode to form valuable coatings despite the approximately neutral pH of the bath from which they are deposited.

20 Claims, No Drawings

WATER DISPERSIBLE EPOXY ETHER-AMINOACRYLATE POLYMERS

The present invention relates to epoxy ether-amino acrylate polymers which are dispersible in water with the aid of an acid. The invention is particularly directed to polymers which exhibit good solubility in the aqueous medium at a pH in the range of 5.0 to 7.0 and which can be electrodeposited at the cathode to produce films exhibiting excellent physical properties.

The history of the electrocoating art has been a continuing effort to electrodeposit films from aqueous medium which possess ever improving properties. At first, the electrodeposited coatings were no match for solvent-based coatings, but the constant improvement resulting from the research efforts of many has largely corrected this. Most of the electrocoating efforts have involved electrodeposition at the anode, and this has limited the film properties which were obtainable, and further improvement has been available relying upon electrodeposition at the cathode, but cathodic electrodeposition has introduced its own problems. Most importantly, the aqueous cathodic electrocoat baths have been unduly acidic, creating corrosion problems, and many of the films have been severely discolored. As previously noted, the aqueous systems herein can be close to neutral, avoiding corrosion problems, the film properties are outstanding, and the coatings are not significantly discolored.

In accordance with this invention, a polyepoxide is reacted with an ethylenically unsaturated alcohol to consume the epoxy functionality in the production of an ethylenically unsaturated hydroxy functional polyether containing from about 1.2 to about 2.0 ethylenically unsaturated ether groups per molecule. This polyether is then copolymerized in organic solvent solution with monoethylenically unsaturated monomers including a proportion of amine-functional monomer, and the resulting amine copolymer is solubilized with the aid of an acid, typically acetic acid, and then dissolved or dispersed in water, preferably at a pH of 5.0–7.0, to enable cathodic electrocoating, normally from a bath having a resin solids content of from 4–20% by weight.

The starting material used in this invention is a polyepoxide, and preferably a polyglycidyl ether of a dihydric organic compound. In this instance, the phenolic OH group is included within the term "hydric", and the common epoxy resins which are diglycidyl ethers of bisphenols are particularly preferred.

The polyepoxides which are useful herein have a 1,2-epoxy equivalency of from 1.2 to about 2.0. Higher functional polyepoxides present an increased danger of gelation during copolymerization. The preferred epoxides are polyglycidyl ethers having a 1,2-epoxy equivalency from 1.4 to 2.0, and a hydroxy equivalency of at least 0.1. If polyepoxides of higher epoxy functionality are used, then the epoxy functionality in excess of about 2.0 should be consumed as by esterification reaction with a fatty acid or by etherification with a saturated alcohol, and this can be done either prior to, during, or after reaction with the ethylenically unsaturated alcohol. Residual epoxy functionality is not desired.

As noted hereinbefore, the polyglycidyl ethers of bisphenols are preferred, and those having a molecular weight of from about 350 to about 4000 are particularly preferred since these present a plurality of both ether groups and hydroxy groups. These polyepoxides are well known and available in commerce.

The term "bisphenol" denotes a pair of phenolic groups separated by an intervening divalent alkylene group. The commercial materials are derivatives of bisphenol A.

From the standpoint of the commercially available materials, the Shell product Epon 1001 is preferred, this material having an average molecular weight of 1000, a melting point of 67°–74°C., an epoxy value of 0.20 equivalent per 100 grams, and an hydroxyl value of 0.32 equivalent per 100 grams. Other commercial epoxy resins of known characteristics which are also appropriate for use herein are Epon 834, Epon 864, Epon 1004, and Epon 1007.

Various ethylenically unsaturated monohydric alcohols are available for coreaction with the polyepoxide, the reaction being a simple etherification reaction. Of course, homopolymerization of the unsaturated alcohol during the etherification is undesired and unsaturated alcohols which resist homopolymerization are preferably selected, these being illustrated by oleyl alcohol, linoleyl alcohol, linolenyl alcohol, and the like. With care to avoid homopolymerization, acrylic alcohols can be used, such as hydroxy ethyl acrylate, methacrylate, or crotonate. Allyl and methallyl alcohols will further illustrate the useful alcohols.

The etherification reaction is itself conventional, the reactants being cooked together at moderate temperature (75°–175°C.). An organic solvent may be present, especially to assist incorporation of an etherification catalyst, illustrated herein by boron trifluoride etherate. Inert water-miscible solvents, such as methyl ethyl ketone are preferred, since these are nonreactive with the polyepoxide and the alcohol, and they facilitate dissolution in water, which is the ultimate goal of the polymer.

While the etherification reaction is itself a conventional one, it is desired to substantially fully consume the epoxy functionality in the epoxide. When the unsaturated alcohol is the only means relied upon for the consumption of the epoxy group, this means use of at least an approximately stoichiometric proportion of unsaturated alcohol (1 equivalent of hydroxy per equivalent of epoxide) and substantially complete reaction (at least about 90%).

The etherification reaction thus produces a polyethylenically unsaturated hydroxy-functional polyether. Since there is more than one ethylenically unsaturated terminal group, this means that the original polyepoxide is now subject to polymer growth at more than one location. In preferred practice, I start with a diepoxide, and copolymer formation occurs at both ends of the molecule, and it is this aspect of the situation which enables physical and chemical resistance to be maximized without requiring undue acidity for the dissolution of the copolymer in water.

The unsaturated hydroxy functional polyether is then copolymerized, preferably in organic solvent solution, with monoethylenically unsaturated monomers including a proportion of amine-functional monomer to produce an amine copolymer solution. The solution copolymerization is itself conventional, the organic solvent being selected to be water miscible to ease the subsequent solubilization in water with the aid of an acid. Any water-miscible organic solvent may be utilized, such as methyl ethyl ketone, or 2-ethoxy ethanol, and the like.

The unsaturated hydroxy functional polyether should constitute from 5–75% of the copolymer, preferably from 20–60%. The balance of the copolymer should consist essentially of copolymerizable monoethylenically unsaturated monomers, a portion of which is amine-functional to provide the desired water solubility with the aid of a solubilizing acid. Such solubility is easily provided by the presence of from 4–20%, preferably from 6–15%, based on the weight of the copolymer, of monoethylenically unsaturated amine. The amine may be primary, secondary, or tertiary, and, while monoamines are primarily contemplated, polyamines, and even hydroxy functional amines, are considered to be useful. Tertiary monoamines are particularly preferred to provide greatest solubility in water at highest pH.

As already indicated, the balance of the copolymer consists essentially of monoethylenic monomers. Considering first monomers which are not amine-functional, these may be reactive or nonreactive. Any nonreactive monoethylenic monomer such as styrene, vinyl toluene, methyl methacrylate, ethyl acrylate, dibutyl maleate, acrylonitrile, and the like, is appropriate. The larger the proportion of hydroxy-functional polyethylenic polyether, the less nonreactive monoethylenic monomer will be used.

The monoethylenically unsaturated monomers used to form the amine copolymer will preferably include other water soluble reactive monomers, such as acrylamide, N-methylol acrylamide, or hydroxy ethyl acrylate to increase functional reactivity, especially with aminoplast or phenol formaldehyde curing agents which are desirably incorporated in the aqueous electrocoating bath for electrical codeposit at the cathode with the amine copolymers of this invention.

Reactive monoethylenic monomers are particularly desirable since they increase the reactive functionality, and they may also assist in helping solubility at the higher pH levels which are desired herein. On this basis, acrylamide, N-methylol acrylamide, hydroxyethyl acrylate, and similar monomers providing the amide, the N-methylol or the hydroxy group are desirably present, the total proportion of such reactive monomers being desirably in the range of from 5–30%, preferably in the range of 10–25%, based on the total weight of the polymer. The etherified N-methylol group is considered to be equivalent to the N-methylol group itself since the etherifying alcohol is released on baking.

The class of monoethylenic unsaturated amines is itself well known, this invention being illustrated by the commercially available material dimethyl aminoethyl methacrylate. However, monomethyl aminoethyl methacrylate, aminoethyl methacrylate, and the corresponding acrylates, crotonates, and the like are all fully useful herein. Other amine-functional monomers are illustrated by aminoethyl methacrylate, t-butyl aminoethyl methacrylate, and dimethyl aminopropyl meta acrylamide, the latter being preferred along with the dimethyl aminoethyl methacrylate noted above.

It is desired to point out that the monomers which are useful in the production of amine copolymers which may be dissolved in water and applied by electrophoresis at the cathode are themselves well known, and the above discussion of appropriate monomers will have this in mind. There are two aspects of the situation which are unusual. First, a large proportion of the copolymer can be constituted by the polyethylenic hydroxy ethers, and this is unusual because the copolymerization of monoethylenic monomers with polyethylenic polymers normally results in gelation. The polymers of this invention are non-gelled. Second, the copolymerization which takes place at a plurality of locations in the polyethylenic hydroxy functional polyether produces a resin which is both tough physically, and which is also highly soluble at a pH in the range of 5.0–7.0.

It is also desired to point out that the unsaturated hydroxy functional polyethers used herein can be esterified by reaction with a saturated acid, but this is not desired herein. Such esters exhibit poor hydrolytic stability, and are less soluble in water at high pH, e.g., a pH in the range of pH 5 – pH 7.

The solubilizing acids are also conventional. Organic acids are preferred. Examples of these are formic acid, acetic acid, propionic acid, and the like. Inorganic acids are also useful. Examples of these are sulfuric acid and hydrochloric acid.

The invention is illustrated in the example which follows:

EXAMPLE

Charge Composition (parts by weight)

| | |
|---|---|
| Epoxy resin (see note 1) | 250 |
| Methyl ethyl ketone | 100 |
| Fatty alcohol (see note 2) | 75 |

Charge the above to reactor and heat to 80°C.

| | |
|---|---|
| Fatty alcohol (see note 2) | 50 |
| Boron trifluoride etherate | .5 |

Add slowly over 15 minute period. Reflux at 90°C. for 2 hours. Distill off methyl ethyl ketone and raise to 140°C. Hold 2 hours and add:

| | |
|---|---|
| 2-Butoxy ethanol | 210 |

Hold for two hours and then add:

| | |
|---|---|
| Acrylamide | 65 |
| 2-Ethoxy ethanol | 220 |
| Styrene | 108 |
| 2-Ethyl hexyl acrylate | 94 |
| Hydroxy ethyl acrylate | 36 |
| Dimethyl aminoethyl methacrylate | 61 |
| Ditertiary butyl peroxide | 7 |
| Cumene hydroperoxide | 7 |

Add monomer premix over a 3 hour period at 140°C. Hold for 1 hour.

Add 4 parts cumene hydroperoxide and hold for 1 hour.

Add 4 parts cumene hydroperoxide and hold for 1 hour.

Add 43 parts cumene paraformaldehyde and hold for 1 hour. Cool to 70°C. and add 11 parts acetic acid.

The epoxy ether-amino acrylate polymer so-produced has a resin solids content of 45% and a viscosity on the Gardner-Holdt scale of $Z_4 - Z_5$.

Percentage-wise, the compositional breakdown is as follows:

| | |
|---|---|
| Epoxy ether | 48% |
| Acrylamide | 8% |

-continued

| | |
|---|---|
| Styrene | 14% |
| 2-Ethylhexyl acrylate | 12% |
| Hydroxyethyl acrylate | 5% |
| Dimethyl-amino-ethyl methacrylate | 8% |
| Paraformaldehyde | 5% |
| | 100% |

Note 1 - The epoxy resin is a diglycidyl ether of bisphenol A having an average molecular weight to 1000 and an epoxide equivalent weight of 500. The commercial material Epon 1001 (Shell) can be used.

Note 2 - The fatty alcohol is oleyl alcohol provided in the commercial product ADOL 32 (Ashland Oil, Inc.) having an iodine value of 75–85 and an hydroxyl value of 205–225.

The above example produces a solution containing 45% solids as indicated above. On dissolving the same in water to 10% solids, the solution has a pH of 6.95. This solution can be electrodeposited at 120 volts applied for 90 seconds to deposit a film 0.7 mil thick. On baking to cure the same, the film exhibits a pencil hardness of 3H and, despite such hardness, satisfactorily resists 80 in./lbs of reverse impact. 5% salt fog corrosion testing has also been carried out and, after 350 hours of exposure, no corrosion was visible. These properties well equip the coating of this example for single coat use on air conditioner parts.

It is pointed out that this example provides a copolymer containing N-methylol acrylamide, the N-methylol group being formed during the copolymerization by reaction with paraformaldehyde. As a result, the system illustrated in this example is self-curing in the absence of added aminoplast resin, phenolic resin, or the like. However, such additional curing agents can be added and are beneficial to enhance the cure. Moreover, these curing agents are effective even when the acrylamide and paraformaldehyde components are omitted in this example.

The invention is defined in the claims which follow.

I claim:

1. A non-gelled, amine-functional polymer dispersible in water with the aid of a solubilizing acid, said polymer being a copolymer of:
   A. an unsaturated hydroxy functional polyether formed by etherifying a polyepoxide having a 1,2-epoxy equivalency of from 1.2 to about 2.0 with an ethylenically unsaturated monohydric alcohol to consume substantially all of the epoxy functionality in the production of a polyether containing from about 1.2 to about 2.0 ethylenically unsaturated ether groups per molecule; and
   B. copolymerizable monoethylenically unsaturated monomers, a portion of which is amine-functional.

2. A water dispersible polymer as recited in claim 1 in which said copolymer is formed by copolymerization in organic solvent solution and is soluble in water with the aid of a solubilizing acid at a pH of 5.0 to 7.0.

3. A water dispersible polymer as recited in claim 1 in which said monoethylenically unsaturated monomers include water soluble reactive monomers.

4. A water dispersible polymer as recited in claim 3 in which said water soluble reactive monomers provide reactive functionality from the group of amide, N-methylol, etherified N-methylol, and alcoholic hydroxy.

5. A water dispersible polymer as recited in claim 4 in which said water soluble reactive monomers are present in an amount of 5-30%, based on the weight of the polymer.

6. A water dispersible polymer as recited in claim 1 in which said polyepoxide is a polyglycidyl ether.

7. A water dispersible polymer as recited in claim 6 in which said polyglycidyl ether has a 1,2-epoxy equivalency of from 1.4 to 2.0 and a hydroxy equivalency of at least 0.1.

8. A water dispersible polymer as recited in claim 7 in which said polyglycidyl ether is a polyglycidyl ether of a bisphenol having a molecular weight of from about 350 to about 4000.

9. A water dispersible polymer as recited in claim 1 in which said monohydric alcohol is selected from oleyl alcohol, linoleyl alcohol and linolenyl alcohol.

10. A water dispersible polymer as recited in claim 1 in which said solubilizing acid is an organic acid.

11. A water dispersible polymer as recited in claim 1 in which said organic acid is acetic acid.

12. A water dispersible polymer as recited in claim 1 in which said monoethylenically unsaturated monomers include acrylamide, and the amide functionality is reacted with formaldehyde to provide N-methylol functionality to enable said polymer to thermoset in the absence of extraneous curing agent.

13. A water dispersible polymer as recited in claim 1 in which said unsaturated polyether constitutes from 5–75% of the polymer and said copolymer includes from 4–20% of copolymerized monoethylenically unsaturated amine.

14. A water dispersible polymer as recited in claim 13 in which said unsaturated polyether constitutes from 20–60% of the weight of the polymer, and the balance of the polymer consists essentially of copolymerized monoethylenically unsaturated monomers including from 6–15% of monoethylenically unsaturated tertiary amine.

15. A water dispersible polymer as recited in claim 14 in which said amine is dimethyl aminoethyl methacrylate.

16. A water dispersible polymer as recited in claim 14 in which said amine is dimethyl aminopropyl meta acrylamide.

17. A water dispersion of the polymer defined in claim 1 dispersed in water with the aid of an acid, said dispersion having a pH in the range of 5.0–7.0.

18. A water dispersion as recited in claim 17 in which said water dispersion further includes an aminoplast or phenolformaldehyde curing agent.

19. An aqueous electrocoat bath comprising the water dispersion of claim 17 having a resin solids content of from 4–20% by weight.

20. A method of electrodepositing a physically tough, corrosion resistant coating on the cathode of a unidirectional electrical system from an aqueous bath having a pH of 5.0–7.0 comprising passing a unidirectional electrical current through the bath defined in claim 19 to deposit a coating of said polymer on the cathode, removing the coated cathode from the bath, and baking the same.

* * * * *

UNITED STATES PATENT OFFICE
CERTIFICATE OF CORRECTION

PATENT NO. : 3,976,615
DATED : August 24, 1976
INVENTOR(S) : Kazys Sekmakas

It is certified that error appears in the above–identified patent and that said Letters Patent are hereby corrected as shown below:

Col. 3, lines 58 and 59 "meta acrylamide" should read -- meth-acrylamide --

Col. 4, line 59, "cumene paraformaldehyde" should read --paraformaldehyde--

Col. 6, claim 16, lines 2 and 3 of the claim, "meta acrylamide" should read -- meth-acrylamide --

Signed and Sealed this

Seventh Day of December 1976

[SEAL]

Attest:

RUTH C. MASON
Attesting Officer

C. MARSHALL DANN
Commissioner of Patents and Trademarks